United States Patent

Taguchi et al.

[11] Patent Number: 5,866,500
[45] Date of Patent: Feb. 2, 1999

[54] PROCESS FOR PRODUCING EXHAUST-GAS-PURIFYING CATALYST

[75] Inventors: Norio Taguchi, Chiryuu; Juji Suzuki, Toyota, both of Japan

[73] Assignee: Toyota Jidosha Kabushiki Kaisha, Tokyo, Japan

[21] Appl. No.: 508,328

[22] Filed: Jul. 27, 1995

[30] Foreign Application Priority Data

Aug. 3, 1994 [JP] Japan .................................... 6-182544

[51] Int. Cl.$^6$ .............................. B01J 23/89; B01J 23/40
[52] U.S. Cl. ........................ 502/326; 502/327; 502/339
[58] Field of Search .................... 502/326, 327, 502/339

[56] References Cited

U.S. PATENT DOCUMENTS

| | | |
|---|---|---|
| 3,993,572 | 11/1976 | Hindin et al. . |
| 4,165,276 | 8/1979 | Antos ........................................ 208/139 |
| 4,284,531 | 8/1981 | Simpson et al. ......................... 252/465 |
| 4,581,343 | 4/1986 | Blanchard et al. . |
| 5,064,803 | 11/1991 | Nunan . |
| 5,073,532 | 12/1991 | Domesle et al. . |
| 5,179,059 | 1/1993 | Domesle et al. . |

FOREIGN PATENT DOCUMENTS

| | | |
|---|---|---|
| 0126676 | 11/1984 | European Pat. Off. . |
| 0411173 | 8/1991 | European Pat. Off. . |
| 0589393 | 3/1994 | European Pat. Off. . |
| 3223500 | 12/1983 | Germany . |
| 3803122 | 7/1989 | Germany . |
| 62-282641 | 12/1987 | Japan . |
| 3-151045 | 6/1991 | Japan . |
| 4-122441 | 4/1992 | Japan . |
| 5-7778 | 1/1993 | Japan . |
| 6-210174 | 8/1994 | Japan . |
| 6-210175 | 8/1994 | Japan . |

*Primary Examiner*—Michael Lewis
*Assistant Examiner*—Alexander G. Ghyka
*Attorney, Agent, or Firm*—Oliff & Berridge, PLC

[57] ABSTRACT

A process for producing an exhaust-gas-purifying catalyst includes the steps of immersing a porous support into a solution including a noble metal catalyst ingredient, thereby preparing a support with a noble metal catalyst ingredient loaded thereon, and thermally treating the noble-metal-catalyst-ingredient-loaded support at a temperature of 800° C. or more in non-oxidizing atmosphere. In the thermally-treating step, the noble metal catalyst ingredient is prevented from being oxidized to its oxide, and accordingly it is inhibited from migrating in vapor phase. Further, in the thermally-treating step, pores of the porous support are contracted so that they surround the noble metal catalyst ingredient closely therein. All in all, the noble metal catalyst ingredient is prevented from sintering. Thus, the resulting exhaust-gas-purifying catalyst is of superb heat-resistance, and it can be applied to elevated temperatures of 800° C. or more in fuel-lean atmosphere.

13 Claims, 6 Drawing Sheets

PROCESS FOR PRODUCING EXHAUST-GAS-PURIFYING CATALYST

BACKGROUND OF THE INVENTION

1. Field of the Invention

The present invention relates to a process for producing an exhaust-gas-purifying catalyst which is capable of simultaneously purify three components, such as hydrocarbons (HC), carbon monoxide (CO) and nitrogen oxides ($NO_x$), included in exhaust gases emitted from internal combustion engines for automobiles etc. An exhaust-gas-purifying catalyst produced in accordance with the present invention is especially useful for applications in fuel-lean atmosphere in which oxygen is included in an amount of the stoichiometric point, or more than required for oxidizing carbon monoxide (CO) and hydrocarbons (HC) in exhaust gases.

2. Description of Related Art

As catalysts for purifying automotive exhaust gases, there have been employed 3-way catalysts so far which oxidize CO and HC and reduce $NO_x$ simultaneously to purify exhaust gases. For example, the 3-way catalysts have been known widely which comprise a heat resistant support formed of cordierite, a porous catalyst carrier layer formed of gamma-alumina and disposed on the support, and a noble metal catalyst ingredient selected from the group consisting of Pt, Pd and Rh and loaded on the porous catalyst carrier layer.

Recently, it has been likely to install an exhaust-gas-purifying catalyst directly below a manifold which is disposed adjacent to an engine, and accordingly an exhaust-gas temperature has been likely to increase during high-speed traveling. As a result, an exhaust-gas-purifying catalyst has been more likely to be exposed to elevated temperatures. However, in conventional exhaust-gas-purifying catalysts, thermal degradation might be developed in the gamma-alumina by high-temperature exhaust gases. The sintering of the noble catalyst ingredient resulting from the thermally-degraded gamma-alumina might possibly deteriorate the catalytic capability of conventional exhaust-gas-purifying catalysts.

In order to solve the possible problems associated with conventional exhaust-gas-purifying catalyst, Japanese Unexamined Patent Publication (KOKAI) No. 4-122,441 discloses a novel process for producing an exhaust-gas-purifying catalyst. In the novel production process, alumina is utilized which has been thermally treated in advance, and a noble metal catalyst ingredient is loaded on the thermally-treated alumina. Since the alumina has been thermally treated in advance by the novel production process, the thermal degradation is hardly developed in the resulting exhaust-gas-purifying catalyst even when it is exposed to elevated temperatures, and accordingly the noble metal catalyst ingredient is little sintered. Thus, the resulting exhaust-gas-purifying catalyst can stably exhibit its catalytic capability.

When driving automobiles, especially when driving automobiles in urban areas, the automobiles are accelerated and decelerated frequently. Consequently, the air-fuel ratio varies frequently in the range of from the values adjacent to the stoichiometric point (or the theoretical air-fuel ratio: 14.6) to the fuel-rich side. In order to satisfy the low fuel consumption requirement during the driving conditions such as in the above-described urban areas, it is necessary to operate the automobiles on the fuel-lean side where the air-fuel mixture containing oxygen as excessive as possible is supplied to the engines.

However, it has been found that the exhaust-gas-purifying catalyst produced by the novel process disclosed in the aforementioned patent publication considerably suffers from the sintering of noble metal catalyst ingredient when it is operated under the fuel-lean conditions and when it is subjected to elevated temperatures of 800° C. or more. Thus, the exhaust-gas-purifying catalyst is degraded in terms of catalytic capability.

SUMMARY OF THE INVENTION

The present invention has been developed in view of the aforementioned circumstances. It is therefore an object of the present invention to provide a process for producing an exhaust-gas-purifying catalyst whose noble metal catalyst ingredient is securely inhibited from sintering when the exhaust-gas-purifying catalyst is operated under the fuel-lean conditions and when it is subjected to elevated temperatures of 800° C. or more.

In a first aspect of the present invention carrying out the aforementioned object, an exhaust-gas-purifying catalyst production process comprises the steps of:

immersing a porous support into a solution including a noble metal catalyst ingredient, thereby preparing a support with a noble metal catalyst ingredient loaded thereon; and thermally treating the noble-metal-catalyst-loaded support at a temperature of 800° C. or more in non-oxidizing atmosphere.

In high-temperature atmosphere in which oxygen coexists, platinum loaded on an alumina surface is oxidized to $PtO_2$. The resulting $PtO_2$ is facilitated to diffuse and aggregate by vapor-phase migration. Accordingly, in the fuel-lean or stoichiometric-point atmosphere which includes $O_2$ in a large amount, platinum exposed to elevated temperatures are sintered to degrade its catalytic capability considerably.

Figure 1:
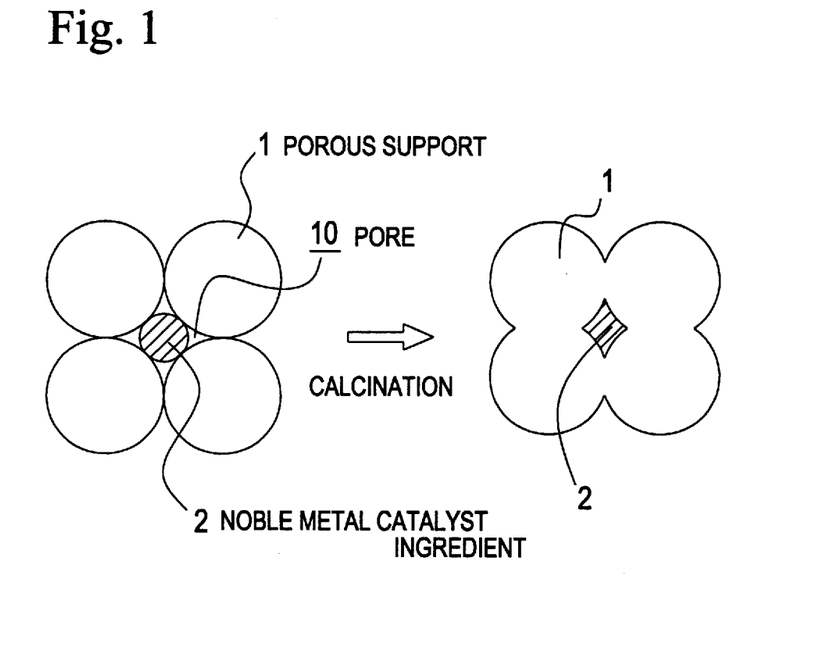
FIG. 1 is a schematic diagram for illustrating changes of a porous support during a thermal treatment step in non-oxidizing atmosphere according to the first aspect of the present invention.

In the first aspect of the present invention, in order to avoid the drawback, the noble-metal-catalyst-loaded support is thermally treated at a temperature of 800° C. or more, preferably in a temperature range of from 900° to 1,200° C., in non-oxidizing atmosphere after loading a noble metal catalyst ingredient. Thus, as illustrated in FIG. 1, a porous support 1 is sintered to contract its pores 10, and the loaded noble metal catalyst ingredient 2 is closely surrounded by the porous support 1. As a result, the noble metal catalyst ingredient is unlikely to migrate.

Further, the thermal treatment is carried out in nonoxidizing atmosphere, a noble metal catalyst ingredient is hardly oxidized to its oxide (e.g., $PtO_2$), and thereby no vapor-phase migration occurs. Accordingly, the noble metal catalyst ingredient is virtually inhibited from sintering, and it is primarily subjected to the reaction in which it is surrounded closely by the porous support. As a result, in the resulting exhaust-gas-purifying catalyst, the noble metal catalyst ingredient is prevented from migrating, and thereby it is inhibited from sintering even in fuel-lean atmosphere.

In order to closely surround the noble metal catalyst ingredient by the porous support more effectively during the thermal treatment, it is preferred that the porous support has an average pore diameter in a range of from 1 to 5 nm, further preferably from 2 to 4 nm, before the thermal treatment. When it has an average pore diameter of less than 1 nm, the noble metal catalyst ingredient is less likely to be loaded in the pores. Moreover, if such is the case, the pores might be closed by the contraction resulting from the thermal treatment, and thereby the catalytic capability of the resulting exhaust-gas-purifying catalyst might be deteriorated. When it has an average pore diameter of more than 5 nm, the porous support comes to have a reduced surface area and degraded holding ability for the noble metal catalyst ingredient or the like. Moreover, if such is the case, it is difficult for the pores to closely surround the noble metal catalyst ingredient even when they are contracted by the thermal treatment. Thus, the pores of such a large average diameter allows the novel metal catalyst ingredient to migrate.

In accordance with the first aspect of the present exhaust-gas-purifying catalyst production process, the noble metal catalyst ingredient is closely surrounded by the porous support. As a result, the noble metal catalyst ingredient can be inhibited from migrating, and consequently it can be prevented from sintering.

In a second aspect of the present invention carrying out the aforementioned object, an exhaust-gas-purifying catalyst production process comprises the steps of:

immersing a porous support into a first solution including a noble metal catalyst ingredient, thereby preparing a support with a noble metal catalyst ingredient loaded thereon;

immersing the noble-metal-catalyst-ingredient-loaded support further into a second solution including an organic substance, thereby preparing a noble-metal-catalyst-ingredient-loaded support with an organic substance loaded thereon; and thermally treating the noble-metal-catalyst-ingredient-and-organic-substance-loaded support under a condition where the organic substance is carbonized.

In the second aspect of the present invention, in order to avoid the drawback, an organic substance is further loaded on the noble-metal-catalyst-loaded support after loading a noble metal catalyst ingredient, and the noble-metal-catalyst-ingredient-and-organic-substance-loaded support is thermally treated under a condition where the organic substance is carbonized. Thus, the carbonized organic substance gets into the clearances between the porous support and the noble metal catalyst ingredient, and functions as an inhibitor for inhibiting the noble metal catalyst ingredient from migrating by means of anchoring effect. Further, it is believed that not only the noble metal catalyst ingredient, but also the carbonized organic substance are fixed by the contraction of the pores of the porous support which is caused by the subsequent thermal treatment, and that part of the carbonized organic substance forms compounds with the noble metal catalyst ingredient. As a result, even when the resulting exhaust-gas-purifying catalyst is exposed to elevated temperatures in fuel-lean atmosphere, the carbonized organic substance is less likely to disappear, and accordingly the noble metal catalyst ingredient is inhibited from sintering for a long period of time. All in all, the resulting exhaust-gas-purifying catalyst can exhibit superb heat resistance.

The amount of carbonaceous substances resulting from the carbonizing preferably falls in a range of from three times to ten times, preferably from three to five times, as much as the loaded noble metal catalyst ingredient by mole. When the amount of carbonaceous substances is less than three times, the resulting carbonaceous substances are less likely to effect the advantages. When the amount of carbonaceous substances is more than ten times, the resulting carbonaceous substances unfavorably inhibit the noble metal catalyst ingredient from effecting its catalytic action.

In accordance with the second aspect of the present exhaust-gas-purifying catalyst production process, the carbonaceous substances go between the porous support and the noble metal catalyst ingredient so as to produce the anchoring effect. As a result, the noble metal catalyst ingredient can be kept from migrating, and accordingly it can be prevented from sintering.

In a third aspect of the present invention carrying out the aforementioned object, an exhaust-gas-purifying catalyst production process comprises the steps of:

immersing a porous support into a first aqueous solution including a noble metal catalyst ingredient, thereby preparing a support with a noble metal catalyst ingredient loaded thereon;

immersing the noble-metal-catalyst-ingredient-loaded support further into a second aqueous solution including at least one base metal selected from the group consisting of Fe, Ni and Co, the base metal, included in the second aqueous solution, forming a complex which is similar to a complex formed by the noble metal catalyst ingredient included in the first aqueous solution, thereby preparing a noble-metal-catalyst-ingredient-loaded support with a base metal loaded thereon; and thermally treating the noble-metal-catalyst-ingredient-and-base-metal-loaded support.

In the third aspect of the present invention, in order to avoid the drawback, the noble-metal-catalyst-ingredient-loaded support is further immersed into a second aqueous solution including at least one base metal selected from the group consisting of Fe, Ni and Co so as to load the base metal thereon after loading a noble metal catalyst ingredient. The base metal is dissolved in the second aqueous solution so as to form a complex which is similar to a complex formed by the noble metal catalyst ingredient included in a first aqueous solution including a noble metal catalyst ingredient.

Although the base-metal complex of similar configuration includes a metal which is different from a noble metal catalyst ingredient, it exhibits physical properties and electric properties which are similar to those of the noble-metal-catalyst-ingredient complex. Hence, the base-metal complex is adsorbed and loaded on the porous support while following a process similar to the adsorbing and loading of the noble-metal-catalyst-ingredient complex. As a result, the base-metal complex is loaded adjacent to the noble-metal-catalyst-ingredient complex on the porous support.

Specifically, in the resulting exhaust-gas-purifying catalyst, the base metal is loaded adjacent to the noble-metal-catalyst-ingredient complex, and it is superior in terms of heat resistance. As a result, even when the resulting exhaust-gas-purifying catalyst is exposed to elevated temperatures in fuel-lean atmosphere, the base metal operates as an inhibitor for inhibiting the noble metal catalyst ingredient from migrating. Thus, the noble metal catalyst ingredient is prohibited from sintering.

The loading amount of the base metal preferably falls in a range of from equal to 2.5 times, preferably from equal to two times, as much as that of the loaded noble metal catalyst ingredient by mole. When the base metal is loaded in an amount of less than equal mole, the base metal is less likely to effect the advantages. When the base metal is loaded in an amount of more than 2.5 times by mole, the base metal inhibits the noble metal catalyst ingredient from effecting its catalytic action.

In accordance with the third aspect of the present exhaust-gas-purifying catalyst production process, the base metal of good heat-resistance is disposed adjacent to the noble metal catalyst ingredient. As a result, the base metal operates as obstacle so as to inhibit the noble metal catalyst from migrating, and consequently the noble metal catalyst ingredient can be prevented from sintering.

In a fourth aspect of the present invention carrying out the aforementioned object, an exhaust-gas-purifying catalyst production process comprises the steps of:

immersing an alumina powder into a platinum solution, thereby preparing an alumina powder with platinum loaded thereon;

thermally treating the platinum-loaded alumina powder at a temperature of 800° C. or more in non-oxidizing atmosphere, thereby preparing an alumina powder with platinum fixed thereon;

immersing an alumina powder into a rhodium solution, thereby preparing an alumina powder with rhodium loaded thereon; and coating the platinum-fixed alumina powder and the rhodium-loaded alumina powder on a surface of a support substrate.

In the fourth aspect of the present invention, platinum (Pt) and rhodium (Rh) are loaded on an independent alumina powder, respectively. Then, the independent alumina powders with Pt and Rh loaded respectively thereon are coated on a support substrate. Accordingly, Pt and Rh encounter with a reduced probability.

Further, the platinum-loaded alumina powder is further subjected to the thermal treatment in non-oxidizing atmosphere in order to prepare the platinum-fixed alumina powder. Consequently, due to actions similar to that of the first aspect of the present invention, Pt is closely surrounded by alumina.

In conventional exhaust-gas-purifying catalysts with Pt and Rh loaded, however, it has been found that Pt migrates towards Rh and makes alloy therewith. As a result, the sintering develops to deteriorate the catalytic capability of conventional Pt-and-Rh-loaded exhaust-gas-purifying catalysts. On the other hand, in the fourth aspect of the present invention, the aforementioned two advantageous actions inhibit Pt and Rh from alloying. Moreover, in a manner similar to that of the first aspect of the present invention, Pt elements are inhibited from sintering. All in all, in the fourth aspect of the present invention, even when the resulting exhaust-gas-purifying catalyst is exposed to elevated temperatures in fuel-lean atmosphere, Pt is securely inhibited from sintering, and Rh is little impaired in terms of its properties (e.g., catalytic and co-catalytic capabilities).

In accordance with the fourth aspect of the present exhaust-gas-purifying catalyst production process, the platinum elements and the rhodium elements are loaded independently. As a result, the platinum elements and the rhodium elements can be kept from making Pt-Rh alloys. Moreover, similarly to the first aspect of the present exhaust-gas-purifying catalyst production process, the platinum elements are closely surrounded by the alumina powder, and accordingly they can be prevented from sintering.

All in all, in accordance with the first through fourth aspects of the present exhaust-gas-purifying catalyst production process, the noble metal catalyst ingredient can be prevented from sintering. Hence, the first through fourth aspects of the present exhaust-gas-purifying catalyst production process enable to securely and easily produce an exhaust-gas-purifying catalyst of superb heat-resistance.

In the first through fourth aspects of the present invention, the porous support or the support substrate can be refractory inorganic oxide which has a large specific surface area. For example, the refractory inorganic oxide can be alumina, silica, titania, or zirconia, etc. It is especially preferred that the porous support or the support substrate be active alumina which exhibits high heat-resistance and has a large specific surface area. The porous support or the support substrate can be formed as a honeycomb shape, or it can be coated on a surface of refractory substrate which is formed as a pellet shape. In addition, the refractory substrate itself can be formed of the porous support.

In the first through fourth aspects of the present invention, the noble metal catalyst ingredient can be at least one element selected from the group consisting of platinum (Pt), palladium (Pd) and rhodium (Rh). A loading amount of the noble metal catalyst ingredient can preferably be 0.1% by weight or more, further preferably from 0.5 to 20% by weight, with respect to the weight of the porous support or the support substrate taken as 100%. When the loading amount of the noble metal catalyst ingredient is less than 0.1% by weight, the resulting exhaust-gas-purifying catalyst effects deteriorated CO and HC oxidation reactions, and it particularly effects degraded $NO_x$ reduction reactions at low temperatures unfavorably. When the loading amount of the noble metal catalyst ingredient exceeds 20% by weight, such loading not only saturates the catalytic actions of the noble metal catalyst ingredient but also pushes up the production costs, and the resulting exhaust-gas-purifying catalyst is likely to effect degraded $NO_x$ reduction reactions at high temperatures.

In the first or fourth aspect of the present invention, the non-oxidizing atmosphere means atmosphere which is free from the inclusion of oxygen. For example, it can be reducing atmosphere, inert gas atmosphere, and vacuum atmosphere.

In the first through fourth aspects of the present invention, the porous support or the support substrate can be processed to have the average pore diameter of from 1 to 5 nm by the following process; namely: hydrated alumina is first produced by a pH-swinging process, a coprecipitation process, an alkoxide process, or a compound precipitation process. Then, the resulting hydrated alumina is thermally treated at a temperature of from 400° to 700° C.

In the second aspect of the present invention, the second solution including an organic substance can be an aqueous solution including gum arabic, polyvinyl alcohol or methylcellulose, or a solution including a resin and an organic solvent capable of dissolving the resin.

In the second aspect of the present invention, the organic-substance-carbonizable condition means a thermal treatment which is carried out in non-oxidizing atmosphere, such as reducing atmosphere, inert atmosphere, and vacuum atmosphere. Note that, however, it is unnecessary that the non-oxidizing atmosphere be free from oxygen completely. For instance, the carbonization can be carried out in non-oxidizing atmosphere which partly includes oxygen. This thermal treatment can be carried out in a temperature range in which the organic substance decomposes thermally, for example, it can be carried out in a temperature range of from 400° to 1,000° C., preferably from 500° to 700° C.

In the third aspect of the present invention, the noble-metal-catalyst-ingredient-and-base-metal-loaded support can be thermally treated at a temperature of 300° C. or more, preferably in a temperature range of from 300° to 500° C.

In the fourth aspect of the present invention, when coating the platinum-fixed alumina powder and the rhodium-loaded alumina powder on a surface of a support substrate, they can be coated thereon compositely, or they can be coated thereon independently in two layers. When they are coated thereon independently in two layers, it is preferred that, in order to inhibit Pt from being poisoned by sulfur, the rhodium-loaded alumina powder be disposed at the top layer, and the platinum-fixed alumina powder be disposed at the bottom layer.

Moreover, in the first through fourth aspects of the present invention, the exhaust-gas-purifying catalyst produced in accordance with the present invention can further include an extra component such as the following metallic oxides: ceria, zirconia, lanthana, and yttria. It is needless to mention that, when the resulting exhaust-gas-purifying catalyst includes the extra component, it operates to produce additional advantageous effects which are inherent to the extra components.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment (Alumina Preparation Step)

An aluminum nitrate aqueous solution and a sodium aluminate aqueous solution were alternately mixed ten times so that the resulting mixed solution exhibited pH values, 3 and 10, alternately. The aluminum nitrate aqueous solution and the sodium aluminate aqueous solution had a pH value of 1 and 12, respectively. The resulting precipitate was filtered, and washed with distilled water. The resulting powder was calcinated at 500° C., thereby preparing an alumina powder. The resulting alumina powder had an average pore diameter of 2 nm, and exhibited a sharp pore-diameter distribution.

(Noble Metal Catalyst Ingredient Loading Step)

The alumina powder was immersed into a predetermined amount of a platinum dinitrodiammine aqueous solution which had a predetermined concentration, and which was acidified by nitric acid. Then, the water content of the aqueous solution was evaporated to dry the alumina powder. Thereafter, the alumina powder was thermally treated at 300° C. for 2 hours, thereby loading Pt thereon. The loading amount of Pt was 2% by weight.

(Thermal Treatment Step)

The Pt-loaded alumina powder was calcinated at 1,000° C. in vacuum of $10^{-3}$ Torr for 5 hours. After the calcination, the alumina powder was subjected to an X-ray diffraction analysis. According to the results of this analysis, it was verified that no peak resulting from Pt was appeared in the X-ray diffraction chart, and no Pt elements were crystallized.

(Exhaust-Gas-Purifying Catalyst Preparation Step)

With respect to 100 parts by weight of the thus calcinated Pt-loaded alumina powder, 45 parts by weight of an aluminum nitrate aqueous solution having a concentration of 40% by weight, 3 parts by weight of an alumina sol having an alumina content of 10% by weight, and 100 parts by weight of water were mixed so as to prepare a slurry.

Then, a plurality of honeycomb substrates formed of cordierite were immersed into and taken out of the resulting slurry, and thereafter each of them was blown to blow away the slurry in excess. The honeycomb substrates had a volume of 1.5 liter. Each of the substrates was dried at 120° C., and thereafter each of them was calcinated at 500° C. A plurality of exhaust-gas-purifying catalysts were thus produced by the First Preferred Embodiment of the present exhaust-gas-purifying catalyst production process.

Comparative Example No. 1

An alumina powder was prepared by the alumina preparation step of the First Preferred Embodiment. The resulting alumina powder free from Pt loading was calcinated at 1,000° C. in air for 5 hours. Then, the thus calcinated alumina powder was immersed into a predetermined amount of a platinum dinitrodiammine aqueous solution which had a predetermined concentration, and which was acidified by nitric acid. The water content of the aqueous solution was evaporated to dry the alumina powder. Thereafter, the alumina powder was thermally treated at 300° C. for 2 hours, thereby loading Pt thereon. The loading amount of Pt was 2% by weight.

Finally, a plurality of exhaust-gas-purifying catalysts were prepared by subjecting the Pt-loaded alumina powder to the exhaust-gas-purifying catalyst preparation step of the First Preferred Embodiment.

Examination and Evaluation

Each of the exhaust-gas-purifying catalysts produced by the First Preferred Embodiment and Comparative Example No. 1 was subjected to a durability test using a model gas. The model gas simulated an exhaust gas having an air/fuel (A/F) ratio of 18, and included gaseous components in amounts as recited in Table 1 below. Each of the catalysts was exposed to the model gas flow of 25 liter/minute, and degraded at 900° C. for 5 hours.

TABLE 1

| Gaseous Component | CO | $C_3H_6$ | NO | $O_2$ | $CO_2$ | $H_2O$ | $N_2$ |
|---|---|---|---|---|---|---|---|
| Content (vol. %) | 0.10 | 0.06 | 0.25 | 3.50 | 11.5 | 10 | Balance |

Then, each of the catalysts were examined for its HC conversions before and after the durability test. In this HC-conversion examination, another model gas was used which simulated an exhaust gas having an A/F ratio of 14.5±1, and included gaseous components in amounts as recited in Table 2 below. Note that each of the catalysts were subjected a pre-treatment; namely: it was exposed to the model gas which was flowed at a space velocity (SV) of $1.0 \times 10^5$/hour, and it was held therein at 500° C. for 20 minutes. Then, each of them was examined for its HC conversions under the following thermal conditions; namely: the temperature of the model gas was reduced by a factor of 5° C./minutes, and was held for 10 minutes at every 20° C. reduction in order to examine each of them for its HC conversions. The results are recited as temperatures at 50% HC conversion (hereinafter abbreviated to "T50") in Table 3 below.

TABLE 2

| Gaseous Component | CO | $C_3H_6$ | NO | $O_2$ | $CO_2$ | $H_2O$ | $N_2$ |
|---|---|---|---|---|---|---|---|
| Content (vol. %) | 0.50 | 0.07 | 0.28 | 0.30 | 14.5 | 10 | Balance |

TABLE 3

| | Initial | After Durability Test |
|---|---|---|
| 1st Pref. Embodiment | 240° C. | 260° C. |
| Comparative Example No. 1 | 240° C. | 330° C. |

It is apparent from Table 3 that, even after the durability test, the catalysts produced by the First Preferred Embodiment exhibited T50 which was lower than T50 exhibited by the catalysts produced by Comparative Example No. 1. Thus, the catalysts produced by the First Preferred Embodiment were found to be superior to the catalysts produced by Comparative Example No. 1 in terms of durability.

Figure 2:
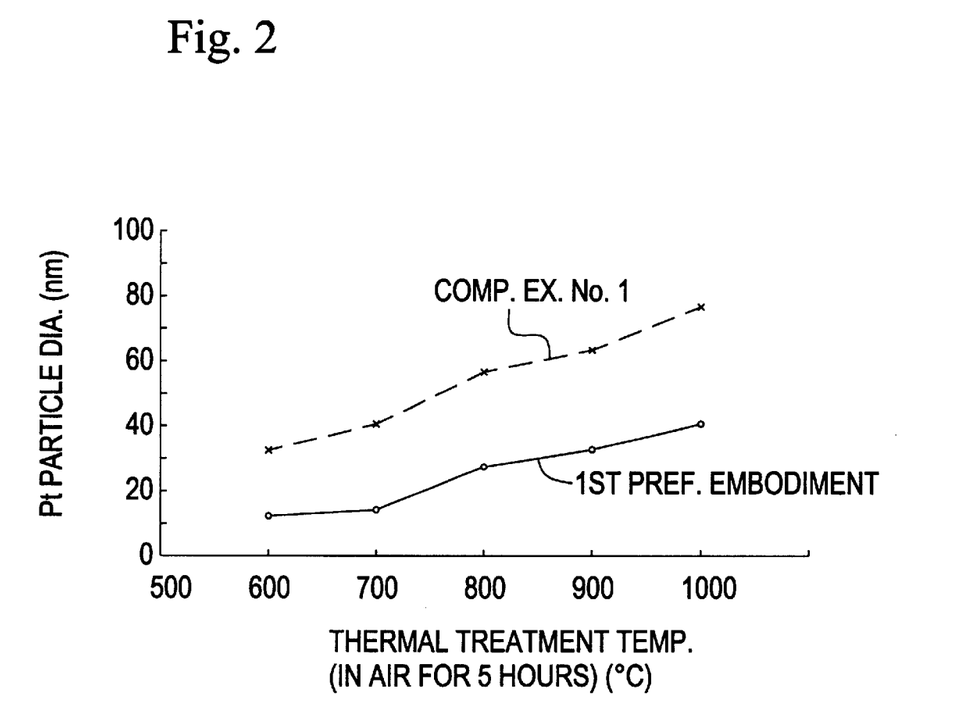
FIG. 2 is a graph for illustrating a relationship between thermal treatment temperatures (in air) and average particle diameters of Pt particles in exhaust-gas-purifying catalysts which were produced by a First Preferred Embodiment according to the present invention.

In addition, each of the catalysts produced by the First Preferred Embodiment and Comparative Example No. 1 were thermally treated in air for 5 hours at various temperatures, and, after this thermal treatment, it was observed for its Pt particle diameter by an optical microscope. The results of this observation are illustrated in FIG. 2. As can be seen from FIG. 2, the catalysts produced by the First Preferred Embodiment had a Pt particle diameter smaller than that of the catalysts produced by Comparative Example No. 1, and their Pt elements were inhibited from sintering. It is believed that this durability difference resulted from the difference in the thermal treatment atmosphere for the Pt-loaded alumina powder.

Second Preferred Embodiment 200 parts by weight of triisopropoxy aluminum was added to 500 milliliters of isopropyl alcohol. The resulting mixture was stirred at 80° C. for 5 hours. Further, 60 milliliters of water was added to the stirred mixture to hydrolyze it, thereby preparing alumina hydrate. Then, the alumina hydrate was subjected to reduced-pressure drying to remove the alcohol. Thereafter, the thus dried alumina hydrate was calcinated at 700° C. for 5 hours, thereby preparing an alumina powder having an average pore diameter of 5 nm.

Furthermore, in a manner similar to the Pt-loading and thermal-treatment steps of the First Preferred Embodiment, Pt was loaded on the alumina powder, and the Pt-loaded alumina powder was thermally treated at 1,000° C. in vacuum of $10^{-33}$ for 5 hours. After this thermal treatment, the thermally-treated alumina powder was subjected to an X-ray diffraction analysis. According to the resulting X-ray diffraction chart, no Pt crystal was appreciated.

Figure 3:
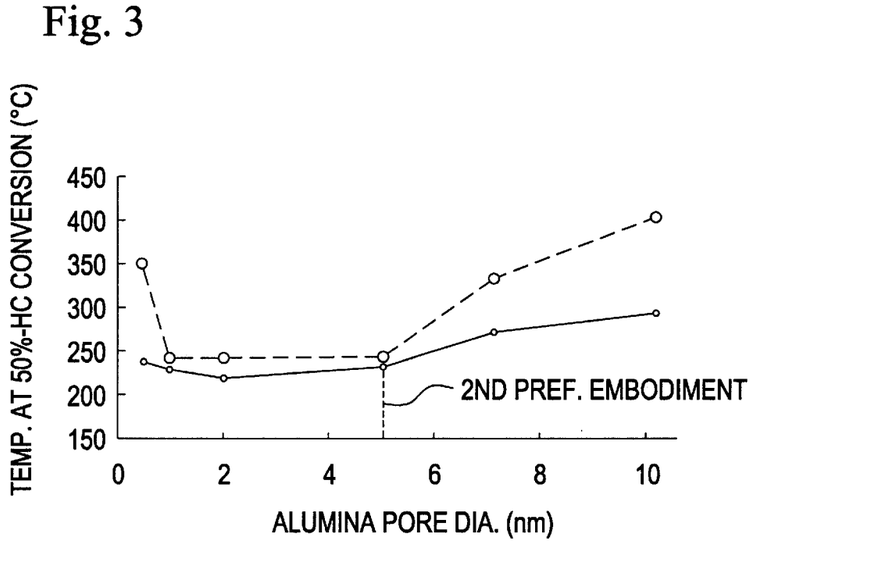
FIG. 3 is a graph for illustrating a relationship between pore diameters of alumina and temperatures at 50%-HC conversion in exhaust-gas-purifying catalysts which were produced by a Second Preferred Embodiment according to the present invention.

Finally, in a manner similar to the First Preferred Embodiment, exhaust-gas-purifying catalysts were prepared. The resulting catalysts were also subjected to the durability test, and were similarly examined for their HC conversions before and after the durability test. The results of this examination are illustrated as T50 with respect to alumina pore diameter in FIG. 3. In FIG. 3, solid circles (●) and solid lines specify initial T50 (i.e., T50 before the durability test), and blank circles (○) and dotted lines specify T50 after the durability test.

In addition, the thermal treatment condition was varied in order to prepare alumina powders having a variety of average pore diameters which fell in a range of from 0.5 to 10 nm. Likewise, various exhaust-gas-catalysts were prepared with these alumina powders, and were similarly examined for their HC conversions before and after the durability test. The results of this examination are also illustrated in FIG. 3.

It is understood from FIG. 3 that, when the alumina powders had an average pore diameter of from 1 to 5 nm, the resulting exhaust-purifying-gas catalysts exhibited reduced HC-conversion differences before and after the durability test, and that these catalysts were especially superb in terms of durability.

Third Preferred Embodiment (Noble Metal Catalyst Ingredient Loading Step)

An active alumina powder was immersed into a predetermined amount of a platinum dinitrodiammine aqueous solution which had a predetermined concentration, and which was acidified by nitric acid. The active alumina powder included lanthanum oxide in an amount of 4% by weight, had a specific surface area of 140 m²/gram, and had been treated at 1,000° C. in advance. Then, the water content of the aqueous solution was evaporated to dry the active alumina powder. Thereafter, the active alumina powder was thermally treated at 300° C. for 2 hours, thereby loading Pt thereon. The loading amount of Pt was 2% by weight.

(Organic Substance Loading Step)

The resulting Pt-loaded active alumina powder was immersed into an aqueous solution which included polyvinyl alcohol in a concentration of 5% by weight. The polyvinyl alcohol had a weight-average molecular weight of 22,000. The Pt-loaded active alumina powder was dispersed evenly in the aqueous solution by an ultrasonic homogenizer, and it was subjected to reduced-pressure drying using an aspirator to dry. After drying, the polyvinyl alcohol was deposited in an amount of 5% by weight with respect to the Pt-loaded active alumina powder.

(Thermal Treatment Step)

The Pt-and-polyvinyl-alcohol-loaded active alumina powder was thermally treated at 1,000° C. in vacuum of $10^{-3}$ Torr for 5 hours. After the thermal treatment, carbonaceous substances were deposited in an amount of 0.6% by weight on the Pt-loaded active alumina powder, and they were amounted to as much as five times as that of loaded Pt by mole.

(Exhaust-Gas-Purifying Catalyst Preparation Step)

With respect to 100 parts by weight of the thus thermally-treated Pt-loaded active alumina powder, 45 parts by weight of an aluminum nitrate aqueous solution having a concentration of 40% by weight, 3 parts by weight of an alumina sol having an alumina content of 10% by weight, and 100 parts by weight of water were mixed so as to prepare a slurry.

Then, a plurality of honeycomb substrates formed of cordierite were immersed into and taken out of the resulting slurry, and thereafter each of them was blown to blow away the slurry in excess. The honeycomb substrates had a volume of 1.5 liter. Each of the substrates was dried at 120° C., and thereafter each of them was calcinated at 500° C. A plurality of exhaust-gas-purifying catalysts were thus produced by the Third Preferred Embodiment of the present exhaust-gas-purifying catalyst production process.

Fourth Preferred Embodiment

The noble-metal-catalyst-ingredient loading step and the organic-substance loading step of the Third Preferred Embodiment were followed in a Fourth Preferred Embodiment of the present exhaust-gas-purifying catalyst production process. However, in the organic-substance loading step, an aqueous solution which included methylcellulose in a concentration of 3% by weight was used instead of the polyvinyl alcohol aqueous solution. Note that the methylcellulose had a weight-average molecular weight of 350,000, and that, after drying, the methylcellulose was deposited in an amount of 5% by weight with respect to the Pt-loaded active alumina powder.

The Pt-and-methylcellulose-loaded active alumina powder was thermally treated at 1,000° C. in a helium gas for 5 hours. The helium gas included $H_2$ in an amount of 10% by volume. After the thermal treatment, carbonaceous substances are deposited in an amount of 0.8% by weight on the Pt-loaded active alumina powder, and they resided thereon 6.7 times as much as that of loaded Pt by mole.

Finally, the exhaust-gas-purifying-catalyst preparation step of the Third Preferred Embodiment was followed, exhaust-gas-purifying catalysts were thus prepared by the Fourth Preferred Embodiment.

Comparative Example No. 2

The Pt-loaded active alumina powder prepared by the noble-metal-catalyst-ingredient loading step of the Third Preferred Embodiment was thermally treated at 1,000° C. in vacuum of $10^{-3}$ Torr for 5 hours. Then, the exhaust-gas-purifying-catalyst preparation step of the Third Preferred Embodiment was followed, exhaust-gas-purifying catalysts were thus prepared by Comparative Example No. 2. Note that the exhaust-gas-purifying catalysts prepared by Comparative Example No. 2 were produced in a manner similar to the First Preferred Embodiment of the present exhaust-gas-purifying catalyst production process.

Examination and Evaluation

Each of the exhaust-gas-purifying catalysts produced by the Third and Fourth Preferred Embodiments, and by Comparative Example No. 2 was examined for its HC conversions before and after the durability test in the same manner as set forth in the First Preferred Embodiment. The results are recited as T50 in Table 4 below.

TABLE 4

|  | Initial | After Durability Test |
|---|---|---|
| 3rd Pref. Embodiment | 230° C. | 240° C. |
| 4th Pref. Embodiment | 240° C. | 250° C. |
| Comparative Example No. 2 | 240° C. | 260° C. |

It is apparent from Table 4 that the catalysts produced by the Third and Fourth Preferred Embodiments were found to be slightly better the catalysts produced by Comparative Example No. 2 in terms of durability.

Figure 4:
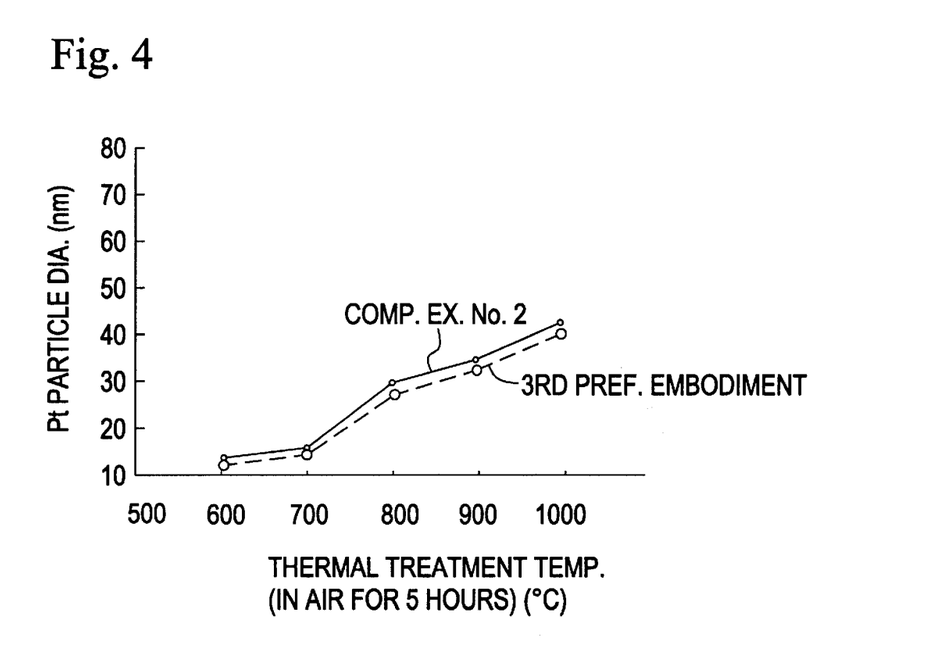
FIG. 4 is a graph for illustrating a relationship between thermal treatment temperatures (in air) and average particle diameters of Pt particles in exhaust-gas-purifying catalysts which were produced by a Third Preferred Embodiment according to the present invention.

In addition, each of the catalysts produced by the Third Preferred Embodiment and Comparative Example No. 2 was thermally treated in air for 5 hours at various temperatures, and, after this heat treatment, it was observed for its Pt particle diameter by an optical microscope. The results of this observation are illustrated in FIG. 4. As can be seen from FIG. 4, the catalysts produced by the Third Preferred Embodiment had a Pt particle diameter smaller than that of the catalysts produced by Comparative Example No. 2 at a variety of thermal-treatment temperatures, and that their Pt elements were further inhibited from sintering. It is believed that the difference in T50 resulted from the difference in the thermal treatment atmosphere for the Pt-loaded active alumina powder, and the heat-resistance difference resulted from the presence of carbonaceous substances.

Fifth Preferred Embodiment

Except that in the organic-substance loading step, the deposited amount of polyvinyl alcohol was varied in a range of from 1 to 10% by weight with respect to the Pt-loaded active alumina powder, and that the residual amount of carbonaceous substances was varied in a range of from 2 to 12 times as much as that of loaded Pt by mole, a Fifth Preferred Embodiment of the present exhaust-gas-purifying catalyst production process was carried out to prepare exhaust-gas-purifying catalysts similarly to the Third Preferred Embodiment.

Figure 5:
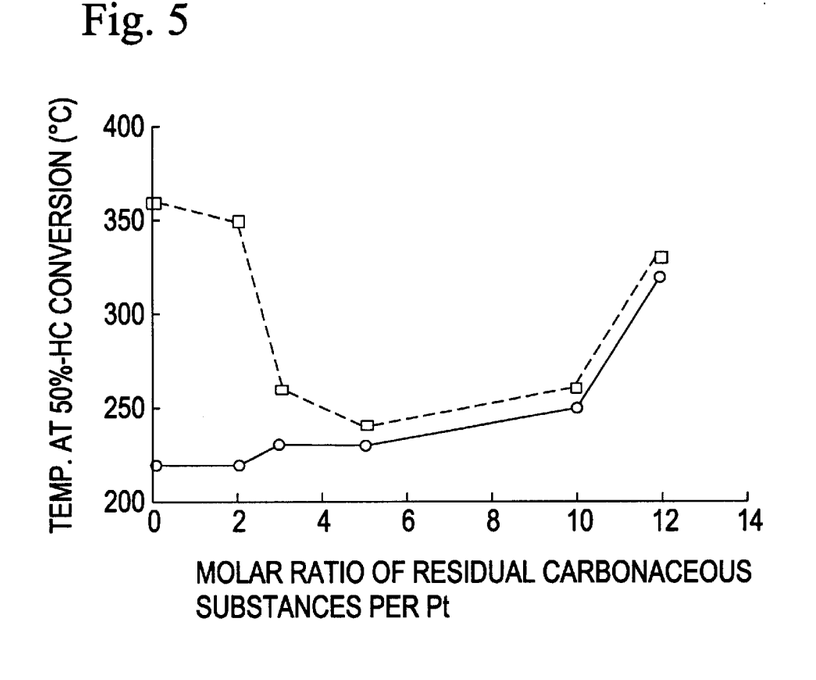
FIG. 5 is a graph for illustrating relationships between molar ratios of residual carbonaceous substances with respect to loaded platinum and temperatures at 50%-HC conversion in exhaust-gas-purifying catalysts which were produced by a Fifth Preferred Embodiment according to the present invention.

Each of the resulting exhaust-gas-purifying catalysts was examined for its HC conversions before and after the durability test in the same manner as aforementioned. The results of this examination are illustrated as T50 with respect to molar ratios of residual-carbonaceous-substances amounts in FIG. 5, along with the results (e.g., the points at the molar ratio=zero) on the exhaust-gas-purifying catalyst produced by Comparative Example No. 2. In FIG. 5, blank circles (○) and solid lines specify initial T50, and blank squares (□) and dotted lines specify T50 after the durability test.

According to FIG. 5, when the residual amount of carbonaceous substances fell in a molar ratio of from 3 to 10 times with respect to loaded Pt, the resulting exhaust-purifying-gas catalysts exhibited reduced HC-conversion differences before and after the durability test, and they exhibited absolutely low T50. Thus, these catalysts were found to have excellent purifying performance.

Sixth Preferred Embodiment (Noble Metal Catalyst Ingredient Loading Step)

An active alumina powder was immersed into a predetermined amount of a platinum dinitrodiammine aqueous solution which had a predetermined concentration, and which was acidified by nitric acid. The active alumina powder included lanthanum oxide in an amount of 4% by weight, had a specific surface area of 140 m²/gram, and had been treated at 1,000° C. in advance. Then, the water content of the aqueous solution was evaporated to dry the active alumina powder. Thereafter, the active alumina powder was thermally treated at 300° C. for 2 hours, thereby loading Pt thereon. The loading amount of Pt was 2% by weight.
(Base Metal Loading Step)

The Pt-loaded active alumina powder was immersed into a predetermined amount of a nickel dinitrodiammine aqueous solution which had a predetermined concentration, and which was acidified by nitric acid. Then, the water content of the aqueous solution was evaporated to dry the active alumina powder. Thereafter, the active alumina powder was thermally treated at 300° C. for 2 hours, thereby loading Ni thereon. The loading amount of Ni was 0.9% by weight, and was 1.5 times as much as that of loaded Pt by mole.
(Thermal Treatment Step)

The resulting Pt-and-Ni-loaded active alumina powder was thermally treated at 300° C. in air for 2 hours.
(Exhaust-Gas-Purifying Catalyst Preparation Step)

With respect to 100 parts by weight of the thus thermally-treated Pt-and-Ni-loaded active alumina powder, 45 parts by weight of an aluminum nitrate aqueous solution having a concentration of 40% by weight, 3 parts by weight of an alumina sol having an alumina content of 10% by weight, and 100 parts by weight of water were mixed so as to prepare a slurry.

Then, a plurality of honeycomb substrates formed of cordierite were immersed into and taken out of the resulting slurry, and thereafter each of them was blown to blow away the slurry in excess. The honeycomb substrates had a volume of 1.5 liter. Each of the substrates was dried at 120° C., and thereafter each of them was calcinated at 500° C. A plurality of exhaust-gas-purifying catalysts were thus produced by the Sixth Preferred Embodiment of the present exhaust-gas-purifying catalyst production process.

Seventh Preferred Embodiment

Except that a platinum tetraammine aqueous solution was used instead of the platinum dinitrodiammine aqueous solution in the noble-metal-catalyst-ingredient loading step, and that a cobalt tetraammine aqueous solution was used instead of the nickel dinitrodiammine aqueous solution in the base-metal loading step, a Seventh Preferred Embodiment of the present exhaust-gas-purifying catalyst production process was carried out in the same manner as the Sixth Preferred Embodiment. Note that the loading amount of Co was 1.2% by weight, and was 2.0 times as much as that of loaded Pt by mole.

Comparative Example No. 3

Except that the Pt-loaded active alumina powder was not subjected to the base-metal loading step, and that the thermal treatment step was carried out subsequently to the noble-metal-catalyst-ingredient loading step, exhaust-gas-purifying catalysts were prepared by Comparative Example No. 3 similarly to the Sixth Preferred Embodiment.

Examination and Evaluation

Each of the exhaust-gas-purifying catalysts produced by the Sixth and Seventh Preferred Embodiments, and by Comparative Example No. 3 was examined for its HC conversions before and after the durability test in the same manner as set forth in the First Preferred Embodiment. The results are recited as T50 in Table 5 below.

TABLE 5

|  | Initial | After Durability Test |
| --- | --- | --- |
| 6th Pref. Embodiment | 230° C. | 260° C. |
| 7th Pref. Embodiment | 240° C. | 240° C. |
| Comparative Example No. 3 | 240° C. | 330° C. |

It is apparent from Table 5 that, even after the durability test, the catalysts produced by the Sixth and Seventh Preferred Embodiments exhibited T50 which was lower than T50 exhibited by the catalysts produced by Comparative Example No. 3. Thus, the catalysts produced by the Sixth and Seventh Preferred Embodiments were found to be superior to the catalysts produced by Comparative Example No. 3 in terms of durability.

Figure 6:
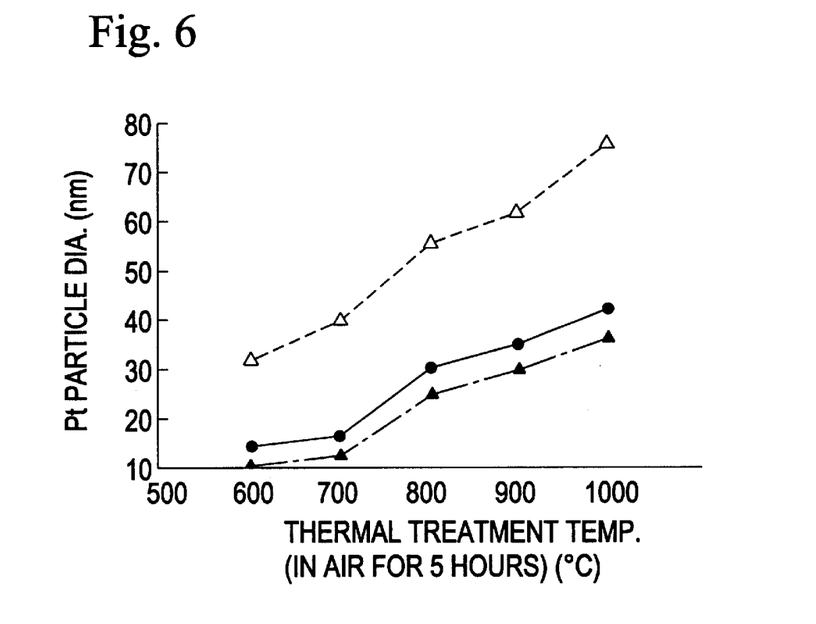
FIG. 6 is a graph for illustrating relationships between thermal treatment temperatures (in air) and average particle diameters of Pt particles in exhaust-gas-purifying catalysts which were produced by Sixth and Seventh Preferred Embodiments according to the present invention.

In addition, each of the catalysts produced by the Sixth and Seventh Preferred Embodiments, and by Comparative Example No. 3 was thermally treated in air for 5 hours at various temperatures, and, after this heat treatment, it was observed for its Pt particle diameter by an optical microscope. The results of this observation are illustrated in FIG. 6. In FIG. 6, solid circles (●) and solid lines specify the results on the Sixth Preferred Embodiment, solid triangles (▲) and alternate-long-and-short-dash lines specify the results on the Seventh Preferred Embodiment, and blank triangles (Δ) and dotted lines specify the results on Comparative Example No. 3.

As can be seen from FIG. 6, the catalysts produced by the Sixth and Seventh Preferred Embodiments had a Pt particle diameter smaller than that of the catalysts produced by Comparative Example No. 3 at a variety of thermal-treatment temperatures, and that their Pt elements were further inhibited from sintering. It is believed that the difference in T50 resulted from the difference in the thermal treatment atmosphere for the Pt-loaded active alumina powder, and the heat-resistance difference resulted from the presence of base-metal loading.

Eighth Preferred Embodiment

Except that in the base-metal loading step of the Sixth and Seventh Preferred Embodiments, the loading amount of Ni and that of Co were varied in a range of from 0.5 to 3% by weight with respect to the amount of loaded Pt, an Eighth Preferred Embodiment of the present exhaust-gas-purifying catalyst production process was carried out to prepare exhaust-gas-purifying catalysts similarly to the Sixth and Seventh Preferred Embodiments.

Figure 7:
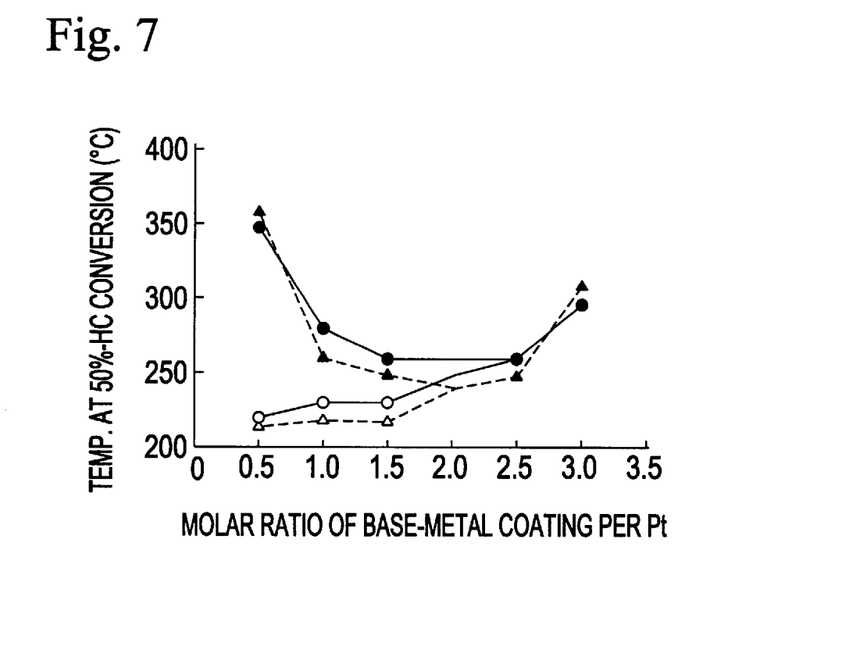
FIG. 7 is a graph for illustrating relationships between molar ratios of base-metal coating with respect to loaded platinum and temperatures at 50%-HC conversion in exhaust-gas-purifying catalysts which were produced by the Sixth and Seventh Preferred Embodiments.

Each of the resulting exhaust-gas-purifying catalysts was examined for its HC conversions before and after the durability test in the same manner as the First Preferred Embodiment. The results of this examination are illustrated as T50 with respect to molar-ratio of base-metal-coating per loaded-Pt in FIG. 7, along with the results on the exhaust-gas-purifying catalysts produced by the Sixth and Seventh Preferred Embodiments. In FIG. 7, blank circles (○) and solid lines specify initial T50 exhibited by the exhaust-gas-purifying catalysts with Ni loaded, solid circles (●) and solid lines specify T50 exhibited by the exhaust-gas-purifying catalysts with Ni loaded after the durability test, blank triangles (Δ) and dotted lines specify initial T50 exhibited by the exhaust-gas-purifying catalysts with Co loaded, and solid triangles (▲) and dotted lines specify T50 exhibited by the exhaust-gas-purifying catalysts with Co loaded after the durability test.

It is apparent from FIG. 7 that, regarding the molar ratio of base metal to Pt, the resulting exhaust-gas-purifying catalysts preferably exhibited reduced HC conversion difference before and after the durability test when the loading amount of Ni fell in a range of from 1 to 2.5 times as much as that of loaded Pt by mole, and when the loading amount of Co fell in a range of from 0.5 to 2.5 times as much as that of loaded Pt by mole.

Ninth Preferred Embodiment
(Alumina Preparation Step)

An aluminum nitrate aqueous solution and a sodium aluminate aqueous solution were alternately mixed ten times so that the resulting mixed solution exhibited pH values, 3 and 10, alternately. The aluminum nitrate aqueous solution and the sodium aluminate aqueous solution had a pH value of 1 and 12, respectively. The resulting precipitate was filtered, and washed with distilled water. The resulting powder was calcinated at 500° C., thereby preparing an alumina powder. The resulting alumina powder had an average pore diameter of 2 nm, and exhibited a sharp pore-diameter distribution.

(Platinum Loading Step)

The alumina powder was immersed into a predetermined amount of a platinum dinitrodiammine aqueous solution which had a predetermined concentration, and which was acidified by nitric acid. Then, the water content of the aqueous solution was evaporated to dry the alumina powder. Thereafter, the alumina powder was thermally treated at 300° C. for 2 hours, thereby loading Pt thereon. The loading amount of Pt was 2% by weight.

(Thermal Treatment Step)

The Pt-loaded alumina powder was thermally treated at 1,000° C. in vacuum of $10^{-3}$ Torr for 5 hours. Thus, an alumina powder with Pt fixed was prepared.

Figure 8:
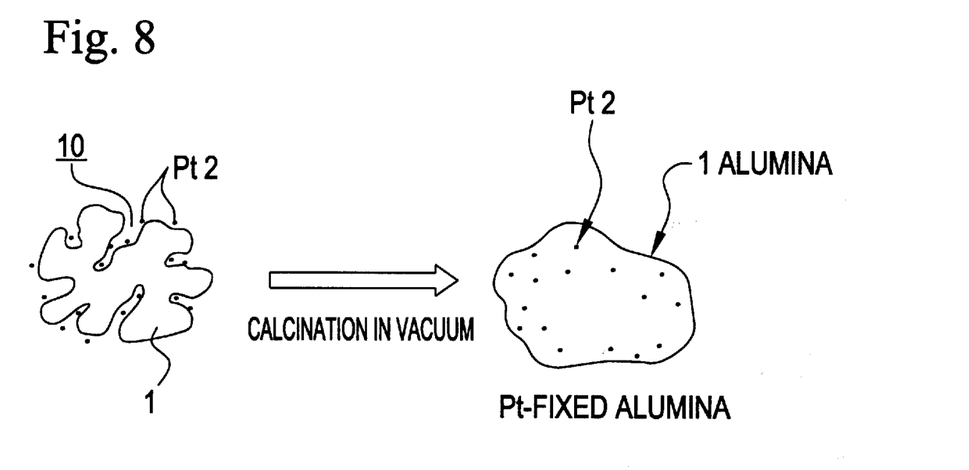
FIG. 8 is a schematic diagram for illustrating changes of alumina during a thermal treatment step in non-oxidizing atmosphere in a Ninth Preferred Embodiment according to the present invention.

FIG. 8 schematically illustrates the changes in this thermal treatment step; namely: platinum elements Pt2 are loaded in pores 10 of an alumina powder 1. Since there exists no oxygen, the platinum elements Pt2 are inhibited from migrating in vapor phase. As a result, when the pores 10 are shrunk by the calcination, the platinum elements Pt2 are surrounded by and fixed closely in the alumina powder 1.

(Rhodium Loading Step)

With respect to 50 parts by weight of active alumina, 50 parts by weight of rhodium chloride aqueous solution having a predetermined concentration was added to mix. Then, the water content of the aqueous solution was evaporated to dry the active alumina. Thereafter, the active alumina was dried at 150° C. for 8 hours, and further it is calcinated at 500° C. for 1 hour, thereby preparing an Rh-loaded active alumina powder. The loading amount of Rh was 0.6% by weight.

(Coating Step)

50 parts by weight of the Pt-fixed alumina powder, 50 parts by weight of the Rh-loaded active alumina powder, 60 parts by weight of an aluminum nitrate aqueous solution having a concentration of 40% by weight, 10 parts by weight of an alumina sol having an alumina content of 10% by weight, 40 parts by weight of a cerium oxide-zirconium oxide composite oxide powder, 20 parts by weight of a lanthanum oxide powder, and 80 parts by weight of pure water were mixed and stirred so as to prepare a slurry.

Then, a plurality of honeycomb substrates formed of cordierite were immersed into and taken out of the resulting slurry, and thereafter each of them was blown to blow away the slurry in excess. The honeycomb substrates had a volume of 1.5 liter. Each of the substrates was dried at 250° C. for 1 hour, and thereafter calcinated at 500° C. for 1 hour. A plurality of exhaust-gas-purifying catalysts were thus produced by the Ninth Preferred Embodiment of the present exhaust-gas-purifying catalyst production process.

Figure 9:
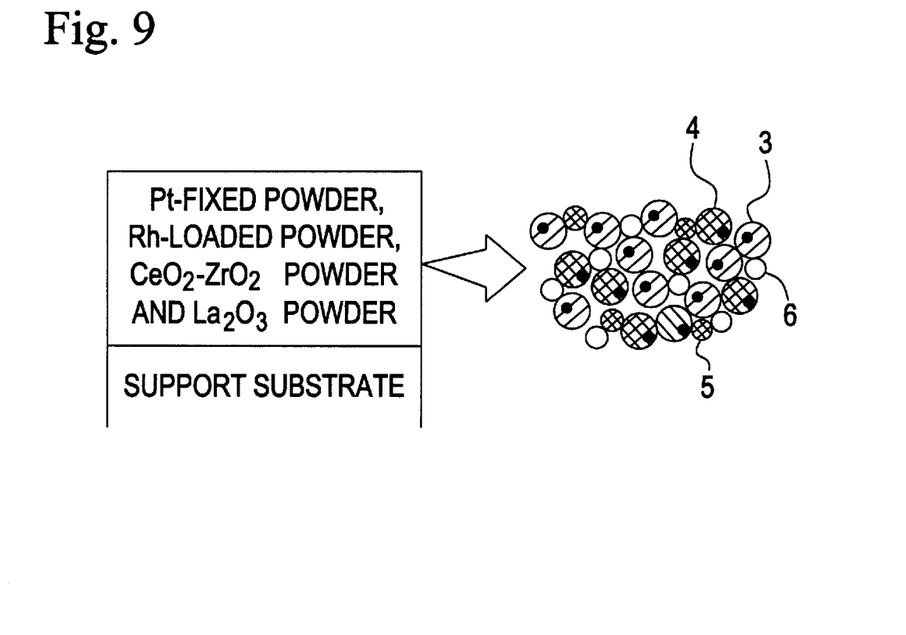
FIG. 9 is a schematic diagram for illustrating a construction of an exhaust-gas-purifying catalyst produced by the Ninth Preferred Embodiment.

FIG. 9 schematically illustrates one of the exhaust-gas-purifying catalysts thus prepared; namely: in the exhaust-gas-purifying catalyst, Pt-fixed alumina particles 3, Rh-loaded active alumina particles 4, cerium oxide-zirconium oxide composite oxide particles 5, and lanthanum oxide particles 6 are mixed and coated on a surface of a support substrate.

Tenth Preferred Embodiment
(Alumina Preparation Step)

200 parts by weight of triisopropoxy aluminum was added to 500 milliliters of isopropyl alcohol. The resulting mixture was stirred at 80° C. for 5 hours. Further, 60 milliliters of water was added to the stirred mixture to hydrolyze it, thereby preparing alumina hydrate. Then, the alumina hydrate was subjected to reduced-pressure drying to remove the alcohol. Thereafter, the thus dried alumina hydrate was calcinated at 700° C. for 5 hours, thereby preparing an alumina powder having an average pore diameter of 5 nm.

(Platinum Loading Step)

The alumina powder was immersed into a predetermined amount of a platinum dinitrodiammine aqueous solution which had a predetermined concentration, and which was acidified by nitric acid. Then, the water content of the aqueous solution was evaporated to dry the alumina powder. Thereafter, the alumina powder was thermally treated at 300° C. for 2 hours, thereby loading Pt thereon. The loading amount of Pt was 2% by weight.

(Thermal Treatment Step)

The resulting Pt-loaded alumina powder was thermally treated at 1,000° C. in a helium gas for 5 hours. The helium gas included $H_2$ in an amount of 10% by volume.

Finally, the rhodium-loading step and the coating step were carried out in the same manner as those of the Ninth Preferred Embodiment, and thereby exhaust-gas-purifying catalysts were prepared by the Tenth Preferred Embodiment.

Eleventh Preferred Embodiment 50 parts by weight of the Pt-fixed alumina powder which was identical with the one prepared by the Ninth Preferred Embodiment, 30 parts by weight of an aluminum nitrate aqueous solution having a concentration of 40% by weight, 5 parts by weight of an alumina sol having an alumina content of 10% by weight, 20 parts by weight of a cerium oxide-zirconium oxide composite oxide powder, 10 parts by weight of a lanthanum oxide powder, and 40 parts by weight of pure water were mixed and stirred so as to prepare a first slurry.

Then, a plurality of honeycomb substrates formed of cordierite was immersed into and taken out of the resulting first slurry, and thereafter each of them was blown to blow away the first slurry in excess, thereby forming a Pt-fixed coating layer. The honeycomb substrates had a volume of 1.5 liter.

Further, 50 parts by weight of the Rh-loaded active alumina powder which was identical with the one prepared by the Ninth Preferred Embodiment, 30 parts by weight of an aluminum nitrate aqueous solution having a concentration of 40% by weight, 5 parts by weight of an alumina sol having an alumina content of 10% by weight, 20 parts by weight of a cerium oxide-zirconium oxide composite oxide powder, 10 parts by weight of a lanthanum oxide powder, and 40 parts by weight of pure water were mixed and stirred so as to prepare a second slurry.

Furthermore, each of the honeycomb substrates having the Pt-fixed coating layer was immersed into and taken out of the resulting second slurry, and thereafter each of them was blown to blow away the second slurry in excess. Each of the substrates was dried 80° C. for 20 minutes, and thereafter each of them was calcinated at 600° C. for 1 hour, and thereby exhaust-gas-purifying catalysts were prepared by the Eleventh Preferred Embodiment.

Figure 10:
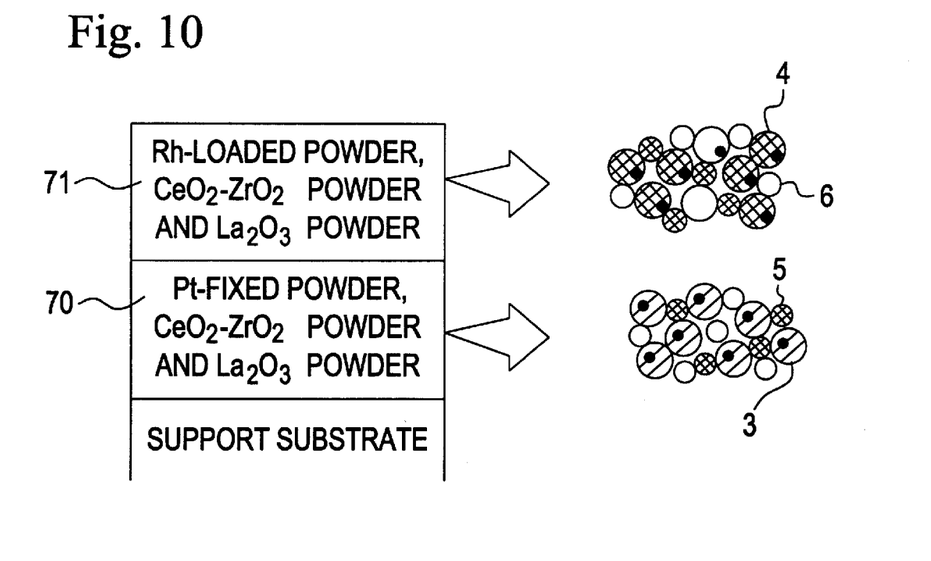
FIG. 10 is a schematic diagram for illustrating a construction of an exhaust-gas-purifying catalyst produced by a Tenth Preferred Embodiment according to the present invention.

FIG. 10 schematically illustrates one of the exhaust-gas-purifying catalysts thus prepared; namely: in the exhaust-gas-purifying catalyst, a first coating layer 70 is disposed on a surface of a support substrate, and a second coating layer 71 is disposed on the first coating layer 70. The first coating layer 70 includes Pt-fixed alumina particles 3, cerium oxide-zirconium oxide composite oxide particles 5, and lanthanum oxide particles 6. The second coating layer 71 includes Rh-loaded active alumina particles 4, cerium oxide-zirconium oxide composite oxide particles 5, and lanthanum oxide particles 6.

Twelfth Preferred Embodiment

Except that the Pt-fixed alumina powder which was identical with the one prepared by the Tenth Preferred Embodiment, and the Rh-loaded active alumina powder which was identical with the one prepared by the Ninth Preferred Embodiment were employed, and except that the coating step of the Eleventh Preferred Embodiment was followed, a Twelfth Preferred Embodiment of the present exhaust-gas-purifying catalyst production process was carried out to prepare exhaust-gas-purifying catalysts.

Comparative Example No. 4

100 parts by weight of an active alumina powder, 60 parts by weight of an aluminum nitrate aqueous solution having a concentration of 40% by weight, 10 parts by weight of an alumina sol having an alumina content of 10% by weight, 40 parts by weight of a cerium oxide powder, and 80 parts by weight of pure water were mixed and stirred so as to prepare a slurry.

Then, a plurality of honeycomb substrates formed of cordierite were immersed into and taken out of the resulting slurry, and thereafter each of them was blown to blow away the slurry in excess. The honeycomb substrates had a volume of 1.5 liter. Each of the substrates was dried at 80° C. for 20 minutes, and thereafter calcinated at 600° C. for 1 hour, thereby preparing honeycomb substrates with a coating layer formed thereon.

Each of the honeycomb substrates with the coating layer formed thereon was immersed into a predetermined amount of a platinum dinitrodiammine aqueous solution which had a predetermined concentration, and which was acidified by nitric acid. After evaporating the water content of the aqueous solution to dry each of the substrates, each of them was further dried at 250° C., thereby loading Pt thereon. The loading amount of Pt was 1.5 grams with respect to 1liter of the substrate.

Moreover, each of the honeycomb substrates with Pt loaded thereon was immersed into a rhodium chloride aqueous solution having a predetermined concentration. After evaporating the water content of the aqueous solution to dry each of the substrates, each of them was further dried at 250° C., thereby loading Rh thereon. The loading amount of Rh was 0.3 grams with respect to 1liter of the substrate.

A plurality of exhaust-gas-purifying catalysts were thus produced by Comparative Example No. 4.

Examination and Evaluation

The five kinds of the exhaust-gas-purifying catalysts produced by the Ninth, Tenth, Eleventh and Twelfth Preferred Embodiments, and by Comparative Example No. 4 were subjected to a durability test; namely: the catalysts were respectively accommodated in a catalyst converter. Each of the catalyst converters was disposed in an exhaust line of an engine. The engine had a displacement of 2 liters. While greatly fluctuating the air-fuel ratio of air-fuel mixture being supplied to the engine around the stoichiometric point and keeping the catalyst bed temperature at 1,000° C., the engine was driven for 50 hours to degrade the catalysts. For instance, the air-fuel ratio was fluctuated by ±1 with respect to the stoichiometric point (e.g., A/F=14.6±1).

After the durability test, each of the catalysts were examined for its temperatures at 50% HC., CO and $NO_x$ conversions. The results of this examination are summarized in Table 6 below. The temperatures at 50% HC., CO and $NO_x$ conversions were determined as follows; namely: the air fuel ratio of air-fuel mixture was fixed at the stoichiometric point (e.g., A/F=14.6), and an inlet temperature was increased in a range of from 240° C. to 440° C. until the catalysts exhibited 50% HC., CO and $NO_x$ conversions. The inlet temperatures at which the catalysts exhibited 50% HC., CO and $NO_x$ conversions were taken as the temperatures at 50% HC., CO and $NO_x$ conversions. The cross-conversions were determined as follows; namely: while the air fuel ratio of air-fuel mixture was fluctuated in a range of from 13.5 to 15.0 and an inlet temperature was fixed at 400° C., the catalysts were examined for HC, CO and $NO_x$ conversions. When the CO conversion and the $NO_x$ conversion crossed (i.e., when they are equal) at a certain A/F ratio, the CO conversion and the $NO_x$ conversion are taken as the CO—$NO_x$ conversion, and HC conversion was measured at the A/F ratio.

TABLE 6

|  | 50% Conversion Temp. (°C.) | | | Cross-Conversion (%) | |
| --- | --- | --- | --- | --- | --- |
|  | HC | CO | NOx | CO-NOx | HC |
| 9th Pref. Embodiment | 325 | 324 | 327 | 89 | 94 |
| 10th Pref. Embodiment | 327 | 321 | 326 | 90 | 95 |
| 11th Pref. Embodiment | 332 | 335 | 328 | 90 | 93 |
| 12th Pref. Embodiment | 321 | 325 | 324 | 89 | 92 |
| Comparative Ex. No. 4 | 358 | 356 | 349 | 80 | 85 |

As summarized in Table 6, after being subjected to the durability test, the catalysts produced by the Ninth through Twelfth Preferred Embodiments exhibited lower 50% conversion temperatures and higher cross conversions than those produced by Comparative Example No. 4 did. Thus, it was appreciated that these catalysts were superb in terms of durability. Specifically, in these catalysts, the Pt elements and the Rh elements were disposed so as to separate from each other, and accordingly the Pt elements were accordingly inhibited from sintering. As a result, the durability of these catalysts was upgraded evidently.

Having now fully described the present invention, it will be apparent to one of ordinary skill in the art that many changes and modifications can be made thereto without departing from the spirit or scope of the present invention as set forth herein including the appended claims.

What is claimed is:

1. A process for producing an exhaust-gas-purifying catalyst, comprising the steps of:

immersing a porous support into a first aqueous solution including a noble metal catalyst ingredient forming a noble metal complex with first ligands, thereby preparing a support with a noble metal catalyst ingredient loaded thereon;

immersing the noble-metal-catalyst-ingredient-loaded support further into a second aqueous solution including at least one base metal forming a base metal complex with the first ligands, the at least one base metal being selected from the group consisting of Fe, Ni and Co, thereby preparing a noble-metal-catalyst-ingredient-loaded support with a base metal loaded thereon; and thermally treating the noble-metal-catalyst-ingredient-and-base-metal-loaded support.

2. The process according to claim 1, wherein said step of immersing a porous support into a first aqueous solution further includes a step of selecting a porous support having an average pore diameter which falls in a range of from 1 to 5 nm.

3. The process according to claim 1, wherein, in said step of immersing a porous support into a first aqueous solution, the noble metal catalyst ingredient is loaded in an amount of 0.1% by weight or more with respect to the weight of the porous support taken as 100%.

4. The process according to claim 1, wherein, in said step of immersing the noble-metal-catalyst-ingredient-loaded support into a second aqueous solution, the base metal is loaded in an amount of from equal to 2.5 times as much as that of the loaded noble metal catalyst ingredient by mole.

5. The process according to claim 1, wherein said thermally-treating step is carried out in at least one atmosphere selected from the group consisting of reducing atmosphere, inert gas atmosphere, and vacuum atmosphere.

6. The process according to claim 1, wherein said thermally-treating step is carried out at a temperature of not less than 300° C.

7. A process for producing an exhaust-gas-purifying catalyst, comprising the steps of:

immersing an alumina powder into a platinum solution, thereby preparing an alumina powder with platinum loaded thereon;

thermally treating the platinum-loaded alumina powder at a temperature of 800° C. or more in non-oxidizing atmosphere, thereby preparing an alumina powder with platinum fixed thereon;

immersing an alumina powder into a rhodium solution, thereby preparing an alumina powder with rhodium loaded thereon; and coating the platinum-fixed alumina powder and the rhodium-loaded alumina powder on a surface of a support substrate.

8. The process according to claim 7, wherein said step of coating further includes a step of a support substrate having an average pore diameter which falls in in a range of from 1 to 5 nm.

9. The process according to claim 7, wherein, in said step of coating, platinum is coated in an amount of 0.1% by weight or more with respect to the weight of the support substrate taken as 100%.

10. The process according to claim 7, wherein, in said step of coating, rhodium is coated in an amount of 0.1% by weight or more with respect to the weight of the support substrate taken as 100%.

11. The process according to claim 7, wherein, in said step of coating, the platinum-fixed alumina powder and the rhodium-loaded alumina powder are coated compositely.

12. The process according to claim 7, wherein, in said step of coating, the platinum-fixed alumina powder and the rhodium-loaded alumina powder are coated independently in two layers including a top layer and a bottom layer, the top layer includes the rhodium-loaded alumina powder, and the bottom layer includes the platinum-fixed alumina powder.

13. The process according to claim 7, wherein said thermally-treating step is carried out in at least one atmosphere selected from the group consisting of reducing atmosphere, inert gas atmosphere, and vacuum atmosphere.

* * * * *